(12) United States Patent
Montagu et al.

(10) Patent No.: US 8,292,509 B2
(45) Date of Patent: Oct. 23, 2012

(54) BEARING ARRANGEMENT

(75) Inventors: David W. Montagu, Bristol (GB); John L. Gibbons, Gloucester (GB)

(73) Assignee: Rolls-Royce PLC, London (GB)

( * ) Notice: Subject to any disclaimer, the term of this patent is extended or adjusted under 35 U.S.C. 154(b) by 307 days.

(21) Appl. No.: 12/706,554

(22) Filed: Feb. 16, 2010

(65) Prior Publication Data

US 2010/0247015 A1 Sep. 30, 2010

(30) Foreign Application Priority Data

Mar. 25, 2009 (GB) .................................. 0905110.3

(51) Int. Cl.
*F16C 19/08* (2006.01)
(52) U.S. Cl. ......................... 384/461; 384/490; 384/453
(58) Field of Classification Search .......... 384/453–454, 384/461, 477, 513, 516, 548, 564, 490; 415/111, 415/116, 176; 60/39.5; 29/898.06
See application file for complete search history.

(56) References Cited

U.S. PATENT DOCUMENTS

| | | | | |
|---|---|---|---|---|
| 1,433,014 A * | 10/1922 | Kennedy | ........................ | 384/461 |
| 1,506,856 A * | 9/1924 | McCluskey | .................... | 384/461 |
| 2,518,159 A * | 8/1950 | Martin | ........................... | 384/461 |
| 2,822,225 A * | 2/1958 | Teufel | ........................... | 384/461 |
| 3,243,243 A * | 3/1966 | Diver et al. | .................... | 384/465 |
| 3,287,907 A * | 11/1966 | Bill | ................................ | 415/116 |
| 3,302,986 A * | 2/1967 | Grolman et al. | ............... | 384/452 |
| 3,737,202 A * | 6/1973 | Rosales | ......................... | 384/461 |
| 4,664,539 A * | 5/1987 | Li | ..................................... | 384/461 |
| 5,639,166 A * | 6/1997 | Dittenhofer | ................... | 384/454 |
| 6,612,747 B1 * | 9/2003 | Jones | ........................... | 384/461 |
| 2003/0190583 A1 | 10/2003 | Kuhn | | |
| 2010/0178002 A1 * | 7/2010 | Spieth et al. | .................. | 384/512 |

FOREIGN PATENT DOCUMENTS

| | | |
|---|---|---|
| DE | 94 12 908 UI | 1/1996 |
| EP | 1 990 192 A2 | 11/2008 |
| GB | 2432649 A * | 5/2007 |
| JP | A-62-159791 | 7/1987 |
| JP | A-2-80809 | 3/1990 |
| WO | WO 2004/097224 A1 | 11/2004 |
| WO | WO 2006086945 A1 * | 8/2006 |
| WO | WO 2006/117515 A1 | 11/2006 |

OTHER PUBLICATIONS

Jun. 24, 2009 Search Report issued in British Patent Application No. 0905110.3.

* cited by examiner

*Primary Examiner* — Marcus Charles
(74) *Attorney, Agent, or Firm* — Oliff & Berridge, PLC

(57) ABSTRACT

A bearing arrangement for supporting a rotatable shaft relative to a support structure. The bearing arrangement has a first bearing having radially inner and outer races, the inner race being rotatable relative to the outer race in use, and a second bearing arranged such that the first bearing is mounted to the support structure via the second bearing. The second bearing may allow for deflection of the shaft supported by the bearing arrangement.

16 Claims, 2 Drawing Sheets

BEARING ARRANGEMENT

BACKGROUND

1. Field of Invention

The present invention relates to a bearing arrangement and more particularly, although not exclusively, to a thrust bearing.

2. Related Art

Thrust bearings represent a subset of rotary bearings which are designed to support a rotating member under axial loading. Examples in which such axial loading can occur include shafts in, for example, gas turbine engines, wind turbines or other load-bearing shafts in marine, aerospace or automotive drive systems. The following description proceeds in relation to thrust bearings for gas turbine engines but may be equally applicable to other thrust bearing applications.

In FIG. 1, there is shown an exemplary thrust bearing arrangement in which an engine powerplant 10 drives a gearbox 12 via a rotating shaft 14. The powerplant and gearbox are both mounted to a supporting structure, shown generally at 16. Bearing arrangements 18 and 20 are mounted in a spaced relationship on the shaft 14 in the vicinity of the power plant 10 and the gearbox 12 respectively. The supporting structure may comprise one or a number of connecting members defining a force path between the powerplant 10 and gearbox 12 and hence the associated bearings 18 and 20.

If a moment 'M' is applied to the output shaft of the gearbox then the supporting structure will deflect in dependence upon the imposed deflection of the coupling shaft 14. The bearings 18 and 20 as a result become misaligned to a degree dependent on the stiffness of the structure 16, the shaft 14 and upon the magnitude of the applied moment 'M'.

Single row (thrust) ball bearings are widely used in many applications where there is the requirement to accommodate both axial and radial loads under high or low speeds.

Referring to FIG. 2, when a bending moment 'M' is applied to a shaft supported by the bearings, the bending moment experienced by the shaft increases in a linear manner from the bearing 18 which is further from the point of application of the bending moment M to th e bearing 20 which is closest to the point of application. This increase is depicted by the ramped section 22 of bending moment plot 24. When an angular misalignment is applied to the arrangement, a step or jump 26 in the bending moment occurs at bearing 20 as a result of the stiffness in the bearing 20.

The bearing stiffness can be considered a constant for the system and so, if a shaft reduces in diameter and/or if the distance between the bearings is increased, the stiffness of the shaft reduces and the relative impact of the stiffness of the bearing 20 on the system is increased. In an arrangement which has a relatively long, thin and/or flexible shaft, the majority of the stiffness of the system derives from the bearing stiffness.

The ability for conventional single row ball bearings to withstand misalignment is limited. Misalignment will result in higher ball loads within the bearing and a reduction in bearing life. The degree of misalignment considered to be allowable for a particular system depends on a number of factors, including the internal geometry of the bearing design; the physical size of the bearing; the magnitude of applied forces in a radial direction; the duration of the twist on the shaft; and, the stiffness of the shaft and housing. The interaction of these factors will define the maximum angular misalignment possible for the given bearing arrangement.

Furthermore, the mounting of a bearing directly adjacent to the structures which transmit the majority of the thrust load results in a 'hard' bearing mounting arrangement. Such an arrangement allows less deflection of the shaft and can increase the gyroscopic moments experienced by the rotating components. The induced unbalanced dynamic response may be worsened as a result of the inherent stiffness in such a system and could lead to a failure event.

SUMMARY

In view of the above problems, it is an aim of the present invention to provide an improved bearing arrangement which accounts for radial or bending forces applied to a shaft.

According to one aspect of the present invention there is provided a bearing arrangement for supporting a shaft relative to a support structure, the shaft being rotatable about an axis of rotation, the bearing arrangement comprising a first bearing having radially inner and outer races, the inner race being rotatable relative to the outer race in use, and a second bearing arranged such that the first bearing is mounted to the support structure via the second bearing so as to allow compliance of the first bearing in use in a radial direction relative to the axis of rotation.

The second bearing may be mounted to, or assembled with, the first bearing.

The bearing arrangement and/or first bearing may comprise a thrust bearing. The bearing arrangement may comprise an engine shaft bearing arrangement. The shaft may be arranged to drive a fan or propeller.

Typically the first bearing accommodates the rotation of the shaft about a shaft axis and the second bearing accommodates, at least in part, angular deflection of the shaft along its axis.

Preferably the second bearing comprises inner and outer bearing races. According to one particular embodiment, the outer race of the first bearing comprises the inner race of the second bearing. The outer race of the first bearing may have inner and outer surfaces, the inner surface of which is shaped to accommodate the bearing members of the first bearing and the outer surface of which is shaped to accommodate bearing members of the second bearing.

The first and second bearings may comprise respective radially inner and outer bearings relative to the shaft axis. The second bearing may be axially offset from the first bearing relative to the shaft axis.

Any or any combination of the first and/or second bearings may comprise ball bearing members mounted between opposing races thereof. The first bearing may alternatively comprise a roller bearing or hydrodynamic bearing or a plain bearing, which may or may not comprise a bushing.

Inner and outer races of the second bearing may be mounted to the support structure in such a manner as to prevent relative rotation between the inner and outer races and the support structure. The second bearing may be fixed against rotation about the axis of rotation of the shaft. The second bearing may allow deflection of the first bearing in a direction substantially parallel and/or perpendicular to the shaft axis. The outer race of the second bearing may be welded to the support structure or else a member interposed between said outer race and the support structure.

A connector may connect the outer race of the first bearing to the support structure so as to prevent relative rotation therebetween.

The second bearing may be arranged to be mounted to the support structure via a fixing formation. The fixing formation may comprise a base and a seal member arranged to define in part a bearing chamber.

In one embodiment, the inner and outer races of the second bearing are shaped to define an opening for reception of a ball bearing, opposing portions of the opening being defined by each of the inner and outer races. The inner and outer races may be arranged to be angularly offset about the shaft axis such that the opposing portions of the opening are spaced in use.

According to a second aspect of the invention, there is provided a bearing arrangement race member for use in the first aspect, the race member having first and second surfaces, the first surface arranged to accommodate bearing members of the first bearing and the second surface arranged to accommodate bearing members of the second bearing.

The race member may comprise a single or multi-part body, which may be generally annular in shape. The first and second surfaces may be opposing inner and outer surfaces of the annular body.

According to a third aspect of the present invention, there is provided a bearing arrangement for supporting a rotatable shaft relative to a support structure, the bearing arrangement comprising a first bearing having radially inner and outer races, the inner race being rotatable relative to the outer race in use, and a hinge structure arranged such that the first bearing is mountable to the support structure via the hinge structure.

The hinge structure may comprise the second bearing according to the first aspect. Any features of the first and second aspects may be applied to the third aspect comprising a hinge structure.

The bearing arrangement of any aspect may be arranged for use in high speed applications, such as for example within a gas turbine engine. The support structure may comprise a housing structure for the engine.

The term 'bearing' as used herein is intended to be interpreted in its broadest sense as a device to allow relative motion between two parts in a constrained manner.

BRIEF DESCRIPTION OF THE DRAWINGS

One or more working embodiments of the present invention are described in further detail below by way of example with reference to the accompanying drawings, of which.

DETAILED DESCRIPTION OF EMBODIMENTS

Whilst embodiments of the invention are described below specifically in relation to a gas turbine engine thrust bearing, it will be appreciated that the present invention is not limited to such applications and may be applied to other thrust bearing applications, such as for example, within marine propulsion or other industrial pumping or propulsion applications.

Figure 3:
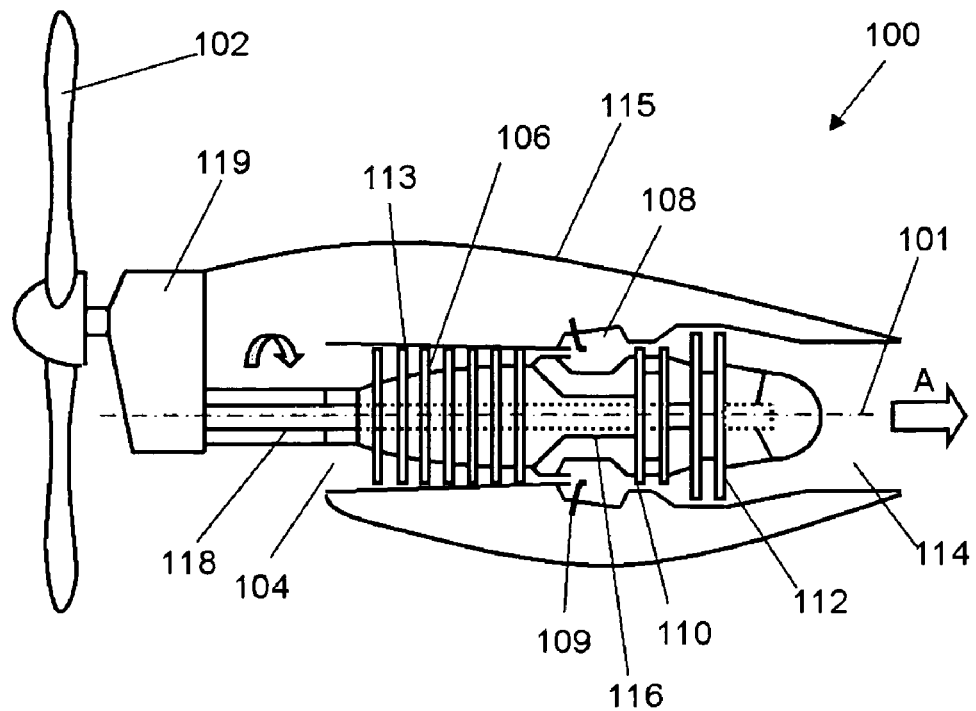
FIG. 3 shows a schematic longitudinal section of a gas turbine engine in which the present invention may be used; and, FIG. 4 shows a section through a lower half of a bearing arrangement according to the present invention.

With reference to FIG. 3, a gas turbine engine is generally indicated at 100 of the type conventionally referred to as a turboprop. The gas turbine engine 100 has a principal and rotational axis 101. The engine 100 comprises, in flow series, a propeller 102, an engine air intake 104, a compressor 106, combustion equipment 108, a high-pressure turbine 110, a low-pressure turbine 112, and a core engine exhaust 114. A casing 113 and nacelles 115 generally surround the core engine and defines the shape of intake 104. It will be appreciated by those skilled in the art that the various possible mounting arrangements for turboprop engines on aircraft result in various possible forms of nacelle and intake profiles.

The gas turbine engine 100 works in a conventional manner so that air entering the intake 104 is compressed by the rotating blades of compressor 106 prior to entering the combustion equipment 108.

The axial compressor 106 comprises a plurality of discs mounted to a drum, each disc having blades mounted thereon in a conventional manner. Each compressor disk may have associated therewith a circumferential set of fixed stators or vanes depending inwardly from the casing 113 so as to provide a plurality of compressor stages.

The compressed air enters the combustion equipment where it is mixed with fuel emanating from fuel injectors 109 and the mixture combusted. Upon exit from the combustion equipment, the resultant hot combustion products expand and thereby drive the high and low-pressure turbines 110 and 112 before being exhausted through the exhaust 114 in the direction of arrow A.

The high pressure turbine 110 is connected to and thereby drives the high pressure compressor 106 by interconnecting shaft 116. The low pressure turbine 112 is connected to, and thereby drives, the propeller 102 via shaft 118. A gearing arrangement 119 is connected in the force path between the shaft 118 and the propeller 102 in order to drive the propeller at a suitable rotational speed to provide propulsive thrust for an aircraft. The core engine exhaust 114 comprises a nozzle formation to provide additional propulsive thrust.

It will be appreciated that the operation of the turboprop engine can in many ways be likened to that of a two-shaft turbofan engine save that the propeller 102 is generally larger than the fan of a turbofan engine and is not ducted. As described above, the present invention may be applied to other forms of gas turbine engine, such as turbofans, or other applications in which a rotating shaft is to be supported by a bearing.

The present invention provides for a compliant bearing arrangement in which a primary bearing is supported by a secondary bearing. The primary bearing may comprise a ball bearing, a roller bearing, a hydrodynamic bearing or a plain bearing, which may or may not comprise a bushing. Ball and roller bearing systems both comprise a plurality of bearing members or elements which are individually rotatable about axes which are spaced form the main axis of rotation of the system (e.g. the main shaft axis). These types of bearing are collectively referred to as roller element bearings.

In the example of FIG. 3, the bearing arrangement of the present invention is used to support shaft 118, typically referred to as the mainline shaft. It is to be noted that the shaft rotates at high speed, typically operating at thousands of revolutions per minute and thus a high speed bearing system is required. The range of rotational speeds may vary significantly dependent on size and application and may be as low as 1,000-2,000 rpm for propeller applications up to as great as 100,000-200,000 rpm for smaller micro-turbines. The present invention may be applicable to the entirety of this range or only a portion thereof, which is considered to encompass high speed applications and associated high speed bearings.

Figure 4:
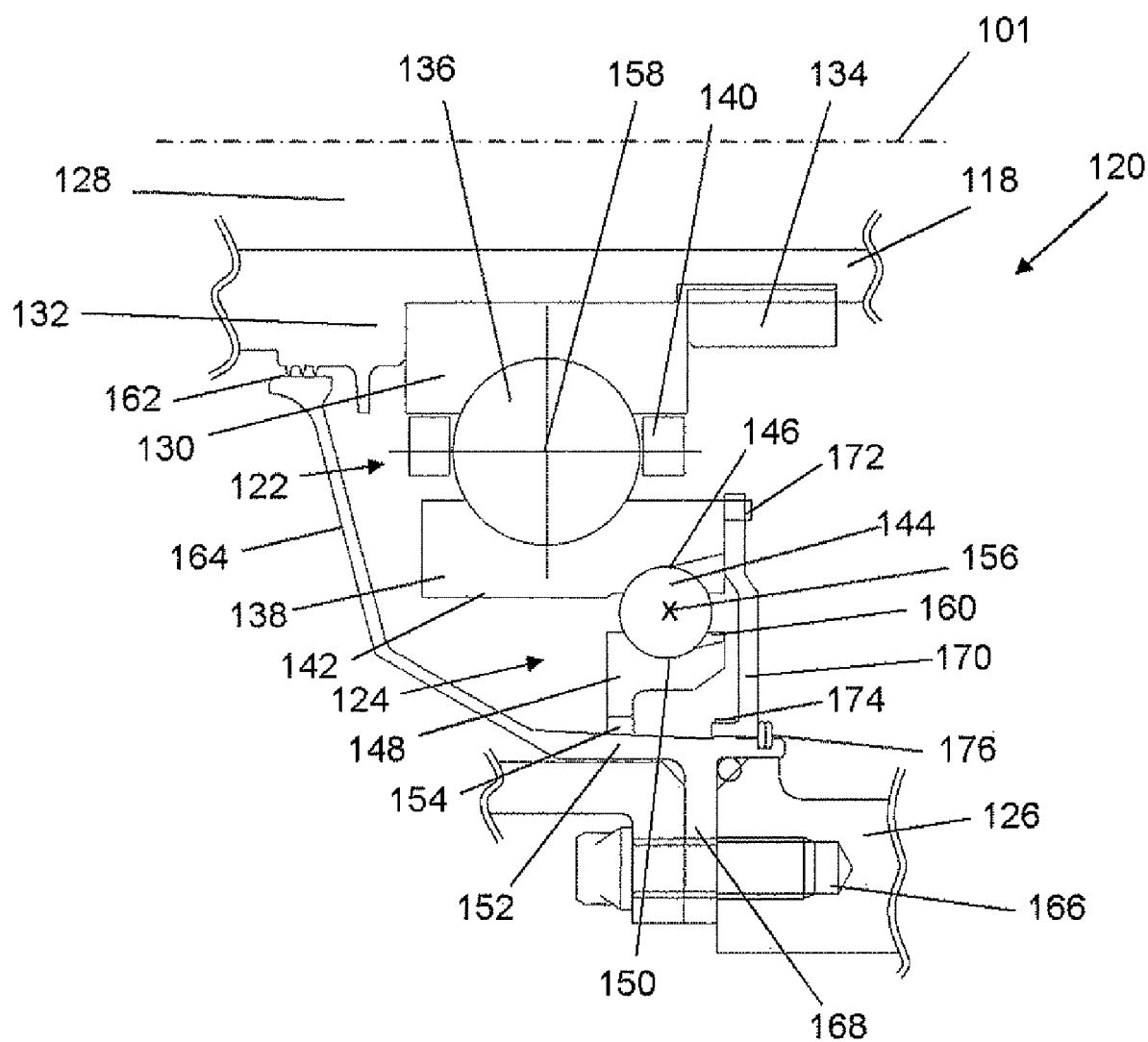

An embodiment of the present invention is shown in FIG. 4. The sectional view is of the lower half of bearing arrangement 120 and is taken through a plane containing the shaft axis 101.

The bearing arrangement 120 supports the shaft 118 relative to a fixed structure, which in this embodiment is a component of housing structure 126. The bearing arrangement in general comprises radially inner 122 and outer 124 bearings arranged such that the inner bearing 122 is interposed between the outer bearing 124 and the shaft 118. Alternatively stated, the inner bearing is supported by the fixed structure 126 via the outer bearing 124. The inner 122 and outer 124 bearings are hereinafter referred to as respective primary and secondary bearings.

The shaft 118 in this embodiment is hollow having a shaft bore 128. The outer wall of the shaft 118 is shaped to receive the inner race 130 of primary bearing 122. In this regard the shaft wall is shaped so as to provide an abutment formation 132 in the form of an annular wall against which the inner race 130 is located. The inner bearing race 130 is held in place on the shaft 118 by a retaining member in the form of a ring nut 134 which locks the inner bearing race against the abutment formation 132.

The inner bearing race 130 is shaped to receive a plurality of ball bearing members 136 in a conventional manner. The inner bearing race has a circumferential groove or other shaped formation for receiving the ball bearings 136 so as to allow movement of the ball bearings 136 about the inner race 132 during operation.

The outer race 138 opposes the inner race and is also shaped to receive the ball bearings therein such that the balls bearings 136 are trapped between the inner and outer races in a conventional manner.

The ball bearings are held in a cage 140 which serves to preserve the relative spacing between the ball bearings whilst allowing rotation thereof about the inner bearing race 130 at high speeds. Any conventional form of cage may be used as will be understood by a person skilled in the art.

In a conventional design, the outer race 138 is rigidly connected to the housing for example by way of a bolted flange joint. In contrast the present invention allows for a more compliant arrangement in which the primary bearing 122 is connected to the housing by a secondary bearing 124. Such an arrangement reduces the stiffness of the bearing system and thus provides for a system which is more tolerant to misalignment which may occur due to bending loads applied to the shaft during use.

Figure 1:
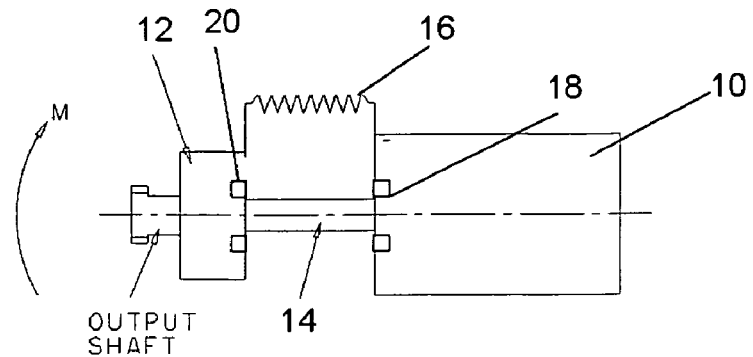
FIG. 1 shows a schematic of an exemplary bearing arrangement according to the prior art.
Figure 2:
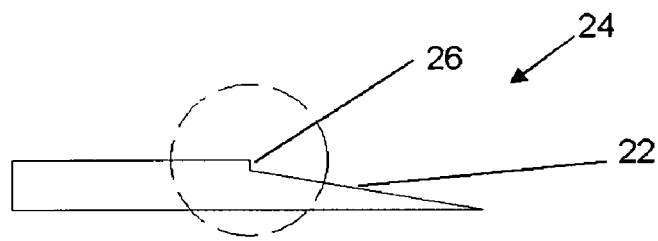
FIG. 2 shows an exemplary plot of the bending moment experienced along the length of the shaft of FIG. 1.

The compliant nature of the bearing arrangement of the present invention means that the angular stiffness of the bearing is reduced and thus the load applied through the bearing arrangement upon bending of the shaft is also reduced. The reduction of the stiffness of the bearing system results in a diminishing effect of the 'step' 26 in FIG. 2, such that the stiffness of the shaft is the predominant stiffness of the overall shaft-and-bearing system. Under such circumstances, the load carried by the ball bearings is reduced such that the life and reliability of the bearing arrangement can be improved.

The primary bearing outer race 138 in the embodiment of FIG. 4 has an outward facing surface 142 which is shaped to accommodate secondary bearing members 144. In this regard the outward facing surface comprises a circumferential grove 146 which partially surrounds the ball bearings 144 of the secondary bearing 124.

The outer race 148 of the secondary bearing is provided with a curved inner facing surface 150 which opposes the outward facing surface of the race 138 so as to define a partially enclosed channel or raceway there-between in which the ball bearings 144 are seated.

Unlike the bearing races of the primary bearing, the races of the secondary bearing do not undergo relative rotation during operation as both races 138 and 148 are fixed relative to the housing 126. The bearing race 148 is welded to fixing 152 at 154. Whilst the alternative of a ring of bolts is possible it is considered in many ways preferable to fix the outer race 148 using an annular weld. Thus the secondary bearing is assembled directly to the bearing housing support structure.

In view of the fact that the secondary bearing does not undergo rotation, a cage is not necessarily required. Accordingly the ball bearings in this embodiment are free to rotate within the bearing groove. In alternative embodiments, the ball bearings in the secondary bearing may be caged. Furthermore the static nature of the secondary bearing in this embodiment means that any misalignment in this bearing does not adversely reduce the rolling contact fatigue life. The ball members 144 may be formed from a lightweight material such as silicon nitride or other suitable material.

As can be seen in FIG. 4, the centre 156 of the balls 144 in the secondary bearing (i.e. the centre of the secondary bearing) is axially offset from the centre 158 of the balls 136 of the primary bearing (i.e. the centre of the primary bearing). The relative location of the secondary bearing 124 allows the primary main-line bearing 122 to pivot or rotate about the secondary bearing in response to bending or misalignment of the shaft 118. As well as reducing the resistance of the bearing to such misalignment, the bearing arrangement 120 also allows for a greater degree of angular deflection of the shaft. In essence, both the primary and secondary bearings share any shaft misalignment.

The secondary bearing is manufactured to allow for small radial clearances but a large axial clearance. It will be appreciated by the skilled person that different types of misalignment may need to be accounted for, such as a static or stationary misalignment or else a dynamic misalignment which may rotate with the shaft or which may be dynamically independent. The present invention may accommodate any or all such types of misalignment.

The secondary bearing 124 is assembled by inserting the ball bearing members 144 into the bearing channel between members 138 and 148 via an assembly slot 160. A bearing slot is formed in the members 138 and/or 148 to allow an opening which is large enough to allow the balls 144 to pass therethrough one at a time. Once the ball bearings have been loaded in bearing 124, either of members 138 or 148 may be rotated about the axis 101 such that the opposing portions of the slot 160 become angularly offset. Thus the slot portions are miss-timed and the balls 144 are prevented from exiting the secondary bearing 124 in use.

An angular restraint may be provided in order to ensure that the slot portions do not become realigned during use. Any suitable form of conventional fixing may be used for this purpose which may comprise a releasable fixing.

A secondary bearing of this type provides for simplicity of assembly, which may take place as part of an engine or module assembly or else which may be assembled separately or 'on the bench'. The overall bearing arrangement may be considered a bi-axial bearing assembly.

A seal 162 is provided adjacent the primary bearing 122 and is mounted on seal arm 164, which provides an air seal for the bearing chamber there-behind. The bearing chamber provides a air-and-oil environment through which oil is fed to the bearing arrangement and subsequently scavenged by the main engine oil scavenge system. For this purpose, there are provided a number of oil scavenge holes (not shown) in the outer race 148 of the secondary bearing to allow oil to pass there-through.

The seal arm 164 has a base or footing which takes the from of the fixing 152. In this manner the bearing arrangement is mounted to the seal arm fixing 152 at 154, which is in turn mounted to the housing structure 126 by bolts 166 which pass through a mounting flange formation 168 depending from fixing 152.

A connector member 170 is attached between the fixing 152 and the primary bearing 122. The connector is mounted between a projection 172 on the primary bearing outer race 138 and a projection 174 on the fixing 152. The connector 170 serves to prevent rotation of the member 138 in use and, as such, acts as a 'dog' or 'tang' arrangement which is secured to the fixing 152 using a simple fastener, such as spring clip 176.

During use, the shaft 118 rotates about axis 101 along with the inner race 130 of primary bearing 122. The ball bearings 136 roll around the inner bearing race 130, whilst outer bearing race 138 is held stationary relative to the housing structure 126 by connector 170. The member 138 performs a dual function and serves as both the primary bearing outer race and also the secondary bearing inner race. The secondary bearing 124 remains stationary relating to the housing structure 126 and allows for slight angular deflection of the primary bearing relative to the axis 101 in response to angular deflection of the shaft 118.

Whilst a part section is shown in FIG. 4, it will be appreciated that the primary and secondary bearings, comprising their opposing races, along with the seal arm 164, fixing 152 and housing 126 are in annular in form and mounted about axis 101.

The invention claimed is:

1. A bearing arrangement for supporting a shaft relative to a support structure, the shaft being rotatable about an axis and the bearing arrangement comprising:
   a first bearing having radially inner and outer opposing portions, the inner portion being rotatable relative to the outer portion in use so as to accommodate rotation of the shaft about said axis, and
   a second bearing mounted to said first bearing and arranged such that the first bearing is mounted to the support structure via the second bearing so as to allow displacement of the first bearing relative to said axis.

2. The bearing arrangement according to claim 1, wherein the second bearing is arranged to accommodate, at least in part, angular deflection of the shaft along its axis.

3. The bearing arrangement according to claim 1, wherein the second bearing comprises inner and outer bearing races.

4. The bearing arrangement according to claim 3, wherein the outer portion of the first bearing comprises the inner race of the second bearing.

5. The bearing arrangement according to claim 4, wherein the outer portion of the first bearing has first and second surfaces, the first surface of which is shaped to accommodate the bearing members of the first bearing and the second surface of which is shaped to accommodate bearing members of the second bearing.

6. The bearing arrangement according to claim 3, wherein inner and outer races of the second bearing are fixed to the support structure so that there is no relative rotation about the shaft axis there-between in use.

7. The bearing arrangement according to claim 3, wherein the outer race of the second bearing is welded to the support structure.

8. The bearing arrangement according to claim 3, wherein the inner and outer races of the second bearing are shaped to define opposing portions of an opening for reception of one or more ball bearings there-between, the inner and outer races arranged to be angularly offset about the shaft axis such that the opposing portions of the opening are spaced in use.

9. The bearing arrangement according to claim 1, wherein the second bearing is offset from the first bearing along the shaft axis.

10. The bearing arrangement according to claim 1, wherein any or any combination of the first and/or second bearings comprises roller bearing members mounted between opposing races thereof.

11. The bearing arrangement according to claim 1, further comprising a connector arranged to connect the outer race of the first bearing to the support structure so as to prevent relative rotation there-between in use.

12. The bearing arrangement according to claim 1, wherein the second bearing is mounted to the support structure via a fixing formation comprising a base and a seal member arranged to define in part a bearing chamber.

13. The bearing arrangement according to claim 1, for use as a high speed thrust bearing within a gas turbine engine.

14. The bearing arrangement according to claim 1, arranged to support a propulsive shaft of an engine.

15. The bearing arrangement race member for use in the bearing arrangement of claim 1, the race member having first and second surfaces, the first surface being shaped to accommodate bearing members of the first bearing and the second surface being shaped to accommodate bearing members of the second bearing.

16. The bearing arrangement of claim 15, wherein the race member comprises a body which is generally annular in shape, the first and second surfaces being opposing inner and outer surfaces of the annular body.

\* \* \* \* \*